US010026946B2

(12) United States Patent
Okuda et al.

(10) Patent No.: US 10,026,946 B2
(45) Date of Patent: Jul. 17, 2018

(54) ELECTRICITY STORAGE DEVICE

(71) Applicant: KABUSHIKI KAISHA TOYOTA JIDOSHOKKI, Aichi-ken (JP)

(72) Inventors: Motoaki Okuda, Kariya (JP); Atsushi Minagata, Kariya (JP); Yohei Hamaguchi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 105 days.

(21) Appl. No.: 15/105,003

(22) PCT Filed: Dec. 24, 2014

(86) PCT No.: PCT/JP2014/084129
§ 371 (c)(1),
(2) Date: Jun. 16, 2016

(87) PCT Pub. No.: WO2015/098955
PCT Pub. Date: Jul. 2, 2015

(65) Prior Publication Data
US 2016/0322626 A1    Nov. 3, 2016

(30) Foreign Application Priority Data

Dec. 25, 2013   (JP) .................................. 2013-266725

(51) Int. Cl.
*H01M 2/26*       (2006.01)
*H01M 2/06*       (2006.01)
(Continued)

(52) U.S. Cl.
CPC .............. *H01M 2/26* (2013.01); *H01G 11/26* (2013.01); *H01G 11/52* (2013.01); *H01G 11/74* (2013.01);
(Continued)

(58) Field of Classification Search
CPC ............ H01M 2/26; H01M 2/06; H01M 2/18; H01M 2/24; H01M 2/266; H01M 10/0413;
(Continued)

(56) References Cited

U.S. PATENT DOCUMENTS

2002/0119367 A1    8/2002  Watanabe et al.
2012/0276437 A1*  11/2012  Onishi ................ H01M 2/0222
                                                        429/139
(Continued)

FOREIGN PATENT DOCUMENTS

JP      9-213377       8/1997
JP    2002-252023      9/2002
(Continued)

OTHER PUBLICATIONS

International Search Report, along with English-language translation thereof, for PCT/JP2014/084129, dated Mar. 3, 2015.
(Continued)

*Primary Examiner* — Stewart A Fraser
*Assistant Examiner* — Rachel L Zhang
(74) *Attorney, Agent, or Firm* — Greenblum & Bernstein, P.L.C.

(57) ABSTRACT

This electricity storage device comprises an electrode assembly, a case, an electrode terminal and a conductive member. The electrode assembly comprises a positive electrode, a negative electrode and a separator. The separator comprises a first separator part and a second separator part. The separator has a container part that contains portions of the positive electrode other than a tab. The separator has a welded part and a tab facing part. The welded part has facing parts that are positioned on both sides of the tab facing part. The facing parts face the electrode terminal with the conductive member being interposed therebetween. The facing (Continued)

parts are larger in shrinkage amount associated with thermal welding than the other portions of the welded part.

4 Claims, 3 Drawing Sheets

(51) Int. Cl.
| | | |
|---|---|---|
| *H01M 2/18* | (2006.01) | |
| *H01G 11/52* | (2013.01) | |
| *H01G 11/74* | (2013.01) | |
| *H01G 11/82* | (2013.01) | |
| *H01M 10/04* | (2006.01) | |
| *H01G 11/26* | (2013.01) | |
| *H01M 2/24* | (2006.01) | |

(52) U.S. Cl.
CPC .............. *H01G 11/82* (2013.01); *H01M 2/06* (2013.01); *H01M 2/18* (2013.01); *H01M 2/24* (2013.01); *H01M 2/266* (2013.01); *H01M 10/0413* (2013.01); *H01M 2/263* (2013.01); *H01M 2220/20* (2013.01); *Y02E 60/13* (2013.01); *Y02T 10/7022* (2013.01)

(58) Field of Classification Search
CPC ....... H01M 2/263; H01G 11/26; H01G 11/52; H01G 11/82
See application file for complete search history.

(56) References Cited

U.S. PATENT DOCUMENTS

| | | | |
|---|---|---|---|
| 2015/0017509 A1 | 1/2015 | Okuda et al. | |
| 2015/0140401 A1 | 5/2015 | Minagata | |
| 2015/0340663 A1* | 11/2015 | Minagata | ............ H01M 2/0237 |
| | | | 429/163 |

FOREIGN PATENT DOCUMENTS

| | | | |
|---|---|---|---|
| JP | 2011-96611 | | 5/2011 |
| JP | 2012-14935 | | 1/2012 |
| JP | 2013-161633 | | 8/2013 |
| JP | 2013-251206 | | 12/2013 |
| JP | 2013-254628 | | 12/2013 |
| WO | WO 2014002647 | * | 1/2014 |

OTHER PUBLICATIONS

Written Opinion of the International Searching Authority for PCT/JP2014/084129, dated Mar. 3, 2015.
International Preliminary Report on Patentability for PCT/JP2014/084129, dated Jun. 28, 2016.

* cited by examiner

ELECTRICITY STORAGE DEVICE

TECHNICAL FIELD

The present invention relates to an electricity storage device that includes an electrode assembly, which includes positive electrodes, negative electrodes, and resin separators that are alternately stacked, and a case, which accommodates the electrode assembly.

BACKGROUND ART

A rechargeable battery that is installed in a vehicle such as an electric vehicle (EV) or a plug in hybrid vehicle (PHV) serves as an electricity storage device that stores power supplied to a travel motor. The rechargeable battery may include an electrode assembly accommodated in a case. The electrode assembly includes sheets of positive electrodes and sheets of negative electrodes that are stacked insulated from one another. Each positive electrode includes positive active material layers applied to opposite surfaces of a positive metal foil. Each negative electrode includes negative active material layers applied to opposite surfaces of a negative metal foil.

In the case, tabs of the positive electrodes are electrically connected to a positive electrode terminal by a conductive member, and tabs of the negative electrodes are electrically connected to a negative electrode terminal by a conductive member. The positive electrode terminal and the negative electrode terminal partially extend through a wall of the case and project out of the case.

In a rechargeable battery such as a lithium-ion battery, the negative active material layers have a larger area than the positive active material layers, and each negative active material layer opposes the entire surface of the corresponding positive active material layer with a separator located in between. This reduces the deposition of lithium metal on the surface of the negative active material layer, which is caused by current concentration during charging.

In such a rechargeable battery, the negative active material layer opposes the vicinity of a basal portion of the positive electrode tab in a stacking direction of the electrode assembly with the separator located in between. Thus, when the positive electrode and the negative electrode are misaligned in a direction extending along a plane of the electrode assembly and the separator is displaced, the positive electrode tab and the negative active material layer may be short-circuited with each other. To limit short-circuiting of the positive electrode tab and the negative active material layer, one side of the separator is partially projected to form a guard that covers the vicinity of the basal portion of the tab (e.g., refer to patent document 1).

PRIOR ART DOCUMENT

Patent Document

Patent Document 1: Japanese Laid-Open Patent Publication No. 2002-252023

SUMMARY OF THE INVENTION

Problems that are to be Solved by the Invention

However, to form a guard by partially projecting one side of the separator as described in patent document 1, for example, a rectangular separator needs to be cut into a form that includes the guard. In such a case, the manufacturing is complicated compared to when using the rectangular separator without making any changes. In this regard, the rectangular separator may be used without making any changes by employing the entire side of the separator where the tab is located as the guard. However, the use of one entire side of the separator as the guard will enlarge the separator. Further, since one entire side of the separator will be closer to the electrode terminals, the separator may interfere with the electrode terminals through the conductive members.

It is an object of the present invention to provide an electricity storage device that limits interference between an electrode terminal and a separator through a conductive member.

Means for Solving the Problem

To achieve the above object, one aspect of the present invention is an electricity storage device that includes an electrode assembly, a case that accommodates the electrode assembly, an electrode terminal, a conductive member. The electrode assembly that includes a positive electrode including a side and a tab that projects from the side, a negative electrode including a side and a tab that projects from the side, a resin separator that includes a side and insulates the positive electrode from the negative electrode, and a tab-side end surface that includes the side of the negative electrode and the side of the separator when the positive electrode, the negative electrode, and the separator are stacked. The case includes a wall opposed to the tab-side end surface. The electrode terminal is fixed to the wall of the case. The conductive member electrically connects the tab of the positive electrode and the electrode terminal. The electrode terminal and the tab-side end surface are opposed to each other in the case with the electrode member located in between. The separator includes a first separator portion and a second separator portion that are opposed and thermally welded to each other. The separator includes an accommodation portion that receives a portion of the positive electrode excluding the tab. The first separator portion includes an edge and an extension that extends from the accommodation portion to the edge. The second separator portion includes an edge and an extension that extends from the accommodation portion to the edge. The separator includes a welded portion, formed by thermally welding the extension of the first separator portion and the extension of the second separator portion, and a tab opposing portion that covers a basal portion of the positive electrode tab. The welded portion includes opposing parts located at opposite sides of the tab opposing portion in a direction extending along the side of the separator. Each of the opposing parts is opposed to the electrode terminal with the conductive member located in between. Each of the opposing parts is configured to have a greater contraction amount than other parts of the welded portion when thermally welded.

In this configuration, the basal portion of the positive electrode tab is covered by the tab opposing portion of the separator. This limits short-circuiting of the positive electrode tab and the negative electrode. The separator includes the opposing parts located at opposite sides of the tab opposing portion along the side of the separator. The amount of the welded portion extending from the accommodation portion at the opposing parts is less than the amount of the welded portion extending from the accommodation portion at other parts. Thus, at the side of the separator, the opposing parts are located below the tab opposing portion, the opposing parts are separated from the wall, to which the electrode terminal is fixed, more than the tab opposing portion. This limits interference of the electrode terminal with the side of the separator through the conductive member while the tab opposing portion limits short-circuiting of the positive electrode tab. The separator that limits short-circuiting of the positive electrode tab and avoids interference between the electrode terminal and the separator through the conductive member may be formed when forming the opposing parts through thermal welding just by increasing the extension contraction amount compared to other parts. This simplifies the manufacturing of the separator compared to when the separator is cut or the like.

Preferably, the electricity storage device further includes a holding tape that is located on each of the opposing parts and integrally holds the positive electrode, the negative electrode, and the separator.

In this configuration, the opposing parts are covered by the holding tape. This guards the opposing parts from the conductive member.

Preferably, the tab opposing portion is non-welded.

In this configuration, when manufacturing the separator, the tab opposing portion does not contract due to thermal welding. This maintains the tab opposing portion between the positive electrode tab and the negative electrode.

Preferably, the separator is tetragonal. Each of the opposing parts is located on a corner of the side of the separator and a further side that is continuous with the side of the separator. The opposing part continuously extends on the side and the further side of the separator.

When forming the welded portion, heat is applied to a side defining the side of the separator and a further side. Thus, for example, when the welded portion is formed on the side of the separator and then the welded portion is formed on the further side of the separator, heat from the further side is also applied to the corner. This increases the contraction amount around the corner. Thus, the opposing parts and the welded portion can be simultaneously formed in the separator.

Preferably, the electricity storage device includes a rechargeable battery.

EMBODIMENTS OF THE INVENTION

One embodiment of an electricity storage device, which is embodied in a rechargeable battery, will now be described with reference to FIGS. 1 to 4.

Figure 1:
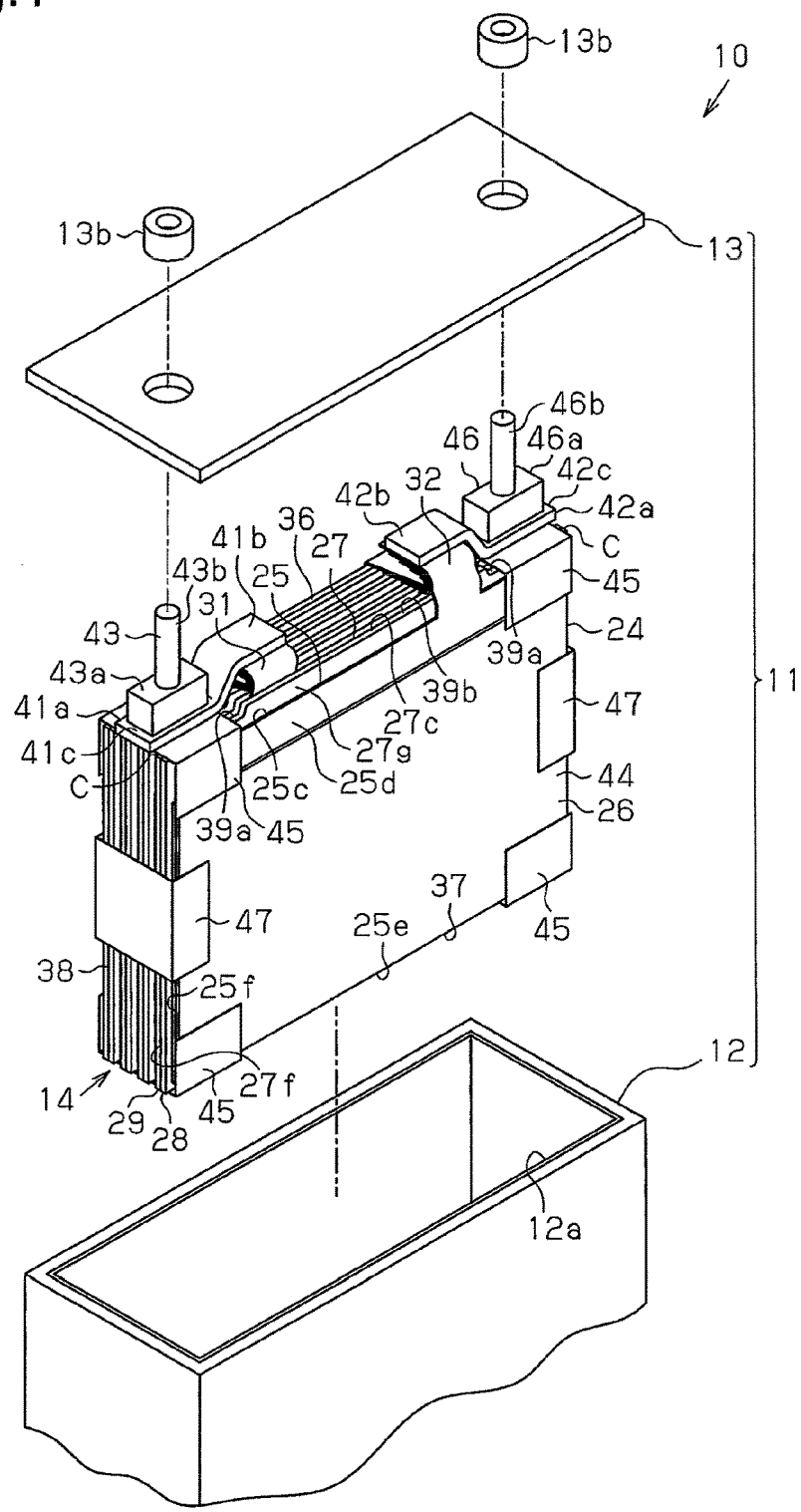
FIG. 1 is an exploded perspective view showing one embodiment of a rechargeable battery according to the present invention.
Figure 2:
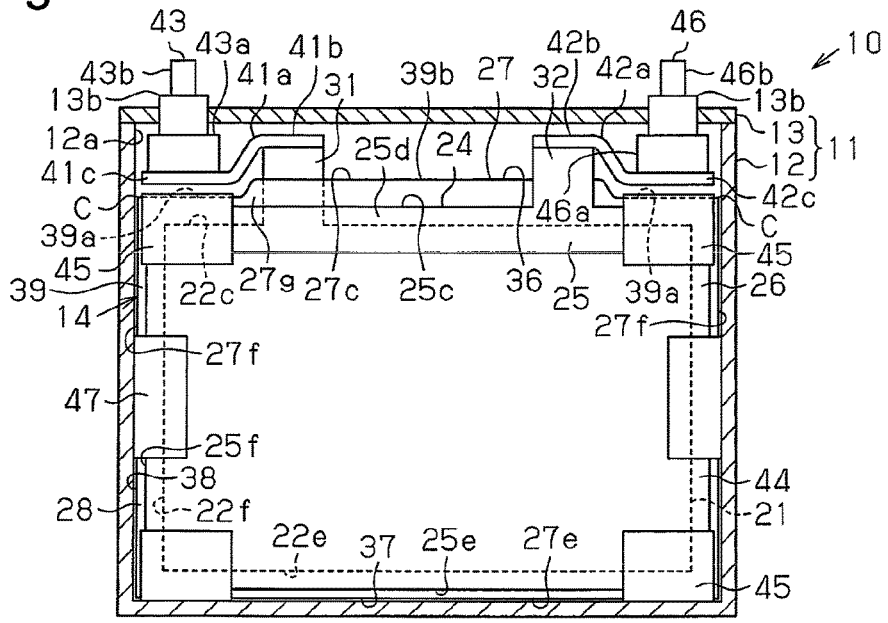
FIG. 2 is a cross-sectional view showing the rechargeable battery shown in FIG. 1.

As shown in FIGS. 1 and 2, a rechargeable battery 10 includes a metal case 11, which defines a shell. The case 11 includes a box-shaped case body 12, which includes an opening 12a in one surface and a closed end, and a cover 13, which closes the opening 12a. The case 11 accommodates an electrode assembly 14 and an electrolytic solution (not shown), which serves as electrolyte. The rechargeable battery 10 is a lithium-ion battery.

Figure 3:
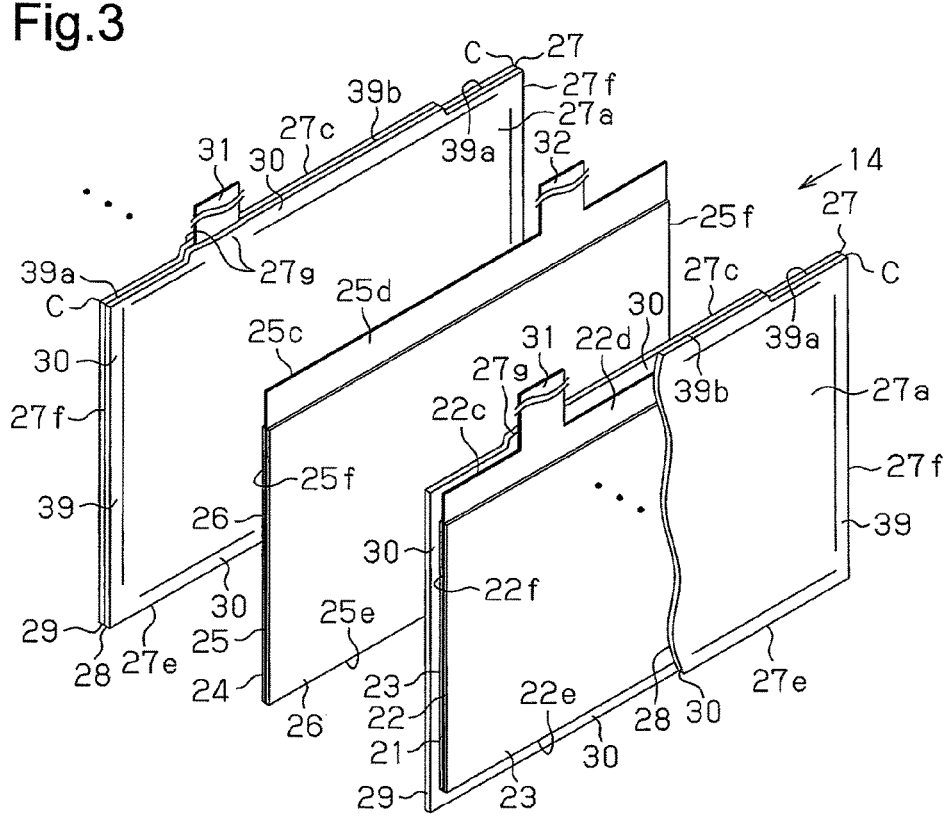
FIG. 3 is an exploded perspective view showing components of the electrode assembly shown in FIG. 1.

As shown in FIG. 3, the electrode assembly 14 includes positive electrodes 21, which serve as positive electrodes, negative electrodes 24, which serve as negative electrode, and resin separators 27, which insulate the positive electrodes 21 from the negative electrodes 24. The electrode assembly 14 has a laminated structure in which the positive electrodes 21 and the negative electrodes 24 are alternately stacked having the separators 27 located in between. Each positive electrode 21 includes a rectangular positive metal foil 22 (in present embodiment, aluminum foil) and rectangular positive active material layers 23 applied to opposite surfaces of the positive metal foil 22. The positive active material layers 23, which are applied to the opposite surfaces of the positive metal foil 22, have the same planar shape and thickness and are opposed to each other with the positive metal foil 22 held in between. The positive electrode 21 includes a first side 22c and a positive electrode non-applied portion 22d, which extends along the first side 22c. The positive electrode non-applied portion 22d is free from the positive active material layer 23 and exposes the positive metal foil 22.

Each positive electrode 21 includes a positive electrode tab 31, which projects from a portion of the first side 22c of the positive electrode non-applied portion 22d and serves as a tab of the positive electrode. The positive electrode tab 31 extends over a constant width in a direction in which the positive electrode tab 31 projects from the first side 22c of the positive electrode non-applied portion 22d. The positive electrode 21 includes a side opposing to the first side 22c, on which the positive electrode tab 31 is located, defining a second side 22e. The positive electrode 21 includes two sides connecting the first side 22c and the second side 22e, which define third sides 22f. The positive electrode tab 31 is located on the first side 22c and is located toward the middle portion from the two third sides 22f. More specifically, the positive electrode tab 31 is located toward the middle portion from the corners where the first side 22c intersects with the third sides 22f.

Each negative electrode 24 includes a rectangular negative metal foil 25 (in present embodiment, copper foil) and rectangular negative active material layers 26 applied to opposite surfaces of the negative metal foil 25. The negative active material layers 26, which are applied to the opposite surfaces of the negative metal foil 25, have the same planar shape and thickness. The negative electrode 24 includes a first side 25c and a negative electrode non-applied portion 25d, which extends along the first side 25c. The negative electrode non-applied portion 25d is free form the negative active material layer 26 and exposes the negative metal foil 25.

Each negative electrode 24 includes a negative electrode tab 32, which projects from a portion of the first side 25c of the negative electrode non-applied portion 25d and serves as a tab of the negative electrode. The negative electrode tab 32 extends over a constant width in a direction in which the negative electrode tab 32 projects from the first side 25c of the negative electrode non-applied portion 25d. The negative electrode 24 includes a side opposing to the first side 25c, on which the negative electrode tab 32 is located, defining a second side 25e. The negative electrode 24 includes two sides connecting the first side 25c and the second side 25e, which define third sides 25f.

Each positive electrode 21 is surrounded by a bag-shaped separator 27. The separator 27 includes a side extending along the first side 22c of the positive electrode 21, which defines a first side 27c and serves as a side of the separator 27. The separator 27 includes side opposing to the first side 27c and extending along the second side 22e of the positive electrode 21, which defines a second side 27e. The separator 27 also includes two sides that connect the first side 27c and the second side 27e and extend along the third sides 22f of the positive electrode 21, which define third sides 27f and serve as further sides that differ from the side of the separator 27. The separator 27 includes corners C that are right-angled portions where the first side 27c intersects with each third side 27f.

As shown in FIG. 1, the positive electrodes 21, the negative electrodes 24, and the separators 27 are stacked so that the positive electrode tabs 31 are aligned in the stacking direction and the negative electrode tabs 32 are aligned in the stacking direction at a position that does not overlap the positive electrode tabs 31. The electrode assembly 14 includes a tab-side end surface 36, which is formed by grouping the first sides 25c of the negative metal foils 25 and the first sides 27c of the separators 27. The positive electrode tabs 31 and the negative electrode tabs 32 are grouped (bundled) within a range from one end to the other end in the stacking direction of the electrode assembly 14 and folded on the tab-side end surface 36. Welding of overlapped portions of the positive electrode tabs 31 electrically connects the positive electrode tabs 31. The positive electrode tabs 31 are connected to a positive conductive member 41a, which serves as a conductive member.

The positive conductive member 41a is a single metal plate, for example, an aluminum plate, and bent in a crank-shaped manner. The positive conductive member 41a includes a bent portion and a positive tab-side welding piece 41b, which is located at one longitudinal side of the bent portion. The positive tab-side welding piece 41b is welded to the positive electrode tabs 31, which are located at one end in the stacking direction. The positive conductive member 41a also includes a terminal-side welding piece 41c, which is located at the other longitudinal side of the bent portion. The terminal-side welding piece 41c is welded to a positive electrode terminal 43, which serves as an electrode terminal. The positive electrode terminal 43 includes a plate-shaped base 43a and a post 43b, which projects from the base 43a. The positive electrode terminal 43 is fixed to the cover 13. The post 43b extends through the cover 13 and projects out of the case 11.

To avoid the base 43a of the positive electrode terminal 43 being located in a gap between the positive electrode tabs 31 and the cover 13 in the case 11, the terminal-side welding piece 41c is located toward the corresponding corners C of the separators 27 from the positive electrode tabs 31 in a direction in which the first sides 22c, 25c, 27c extend on the tab-side end surface 36. Also, to avoid interference of the base 43a with the cover 13, the terminal-side welding piece 41c is located closer to the tab-side end surface 36 of the electrode assembly 14 than the positive tab-side welding piece 41b.

In the same manner, welding of overlapped portions of the negative electrode tabs 32 electrically connects the negative electrode tabs 32. The negative electrode tabs 32 are connected to a negative conductive member 42a, which serves as a conductive member for drawing electricity out of the electrode assembly 14. The negative conductive member 42a is a signal metal plate, for example, a copper plate, and bent in a crank-shaped manner. The negative conductive member 42a includes a bent portion and a negative tab-side welding piece 42b, which is located at one longitudinal side of the bent portion. The negative tab-side welding piece 42b is welded to the negative electrode tabs 32, which are located at one end in the stacking direction.

The negative conductive member 42a also includes a terminal-side welding piece 42c, which is located at the other longitudinal side of the bent portion. The terminal-side welding piece 42c is welded to a negative electrode terminal 46, which serves as an electrode terminal. The negative electrode terminal 46 includes a base 46a and a post 46b, which projects from the base 46a. The negative electrode terminal 46 is fixed to the cover 13. The post 46b extends through the cover 13 and projects out of the case 11.

To avoid the base 46a of the negative electrode terminal 46 being located in a gap between the negative electrode tabs 32 and the cover 13, the terminal-side welding piece 42c is located toward the corresponding corners C of the separators 27 from the negative electrode tabs 32 in the direction in which the first sides 22c, 25c, 27c extend on the tab-side end surface 36. Also, to avoid interference of the base 46a with the cover 13, the terminal-side welding piece 42c is located closer to the tab-side end surface 36 of the electrode assembly 14 than the negative tab-side welding piece 42b. The positive electrode terminal 43 and the negative electrode terminal 46 are each insulated from the cover 13 by an insulation ring 13b.

The dimension extending in the stacking direction of the electrode assembly 14 is referred to as the thickness of the electrode assembly 14. The electrode assembly 14 is adjusted to be slightly thinner than the internal dimension of the case 11. The electrode assembly 14 includes a bottom surface 37 formed by grouping the second sides 25e of the negative metal foils 25 and the second sides 27e of the separators 27. The bottom surface 37 and the tab-side end surface 36 are located at opposite sides of the electrode assembly 14. The electrode assembly 14 further includes two side surfaces 38 formed by grouping the third sides 25f of the negative metal foils 25 and the third sides 27f of the separators 27. Among the surfaces of the electrode assembly 14 connected to the bottom surface 37, the two side surfaces 38 are the ones that differ from two flat surfaces 44, which are located at opposite sides of the electrode assembly 14 in the stacking direction.

The positive electrodes 21 and the negative electrodes 24 are configured so that two adjacent sides (longitudinal side and lateral side) of a negative active material layer 26 are longer than two adjacent sides (longitudinal side and lateral side) of a positive active material layer 23. More specifically, the negative active material layer 26 is large enough to cover the entire surface of the positive active material layer 23.

From the viewpoint of limiting decreases in the energy density of the rechargeable battery 10, the positive electrodes 21 and the negative electrodes 24 having the above structure are stack so that the positive active material layer 23 and the negative active material layer 26 are entirely opposed to each other with a separator 27 located in between and not opposed to each other beyond the separator 27. To prevent misalignment of the electrode assembly 14, which is accurately manufactured in the above manner, in the stacking direction or a direction extending along the flat surfaces 44, the electrode assembly 14 is held by first holding tapes 45 and second holding tapes 47.

Two first holding tapes 45 are attached to the tab-side end surface 36. Two first holding tapes 45 are attached to the bottom surface 37. The strip of each first holding tape 45 has a U-shaped cross-section when adhered. On the tab-side end surface 36, each first holding tape 45 includes two longitudinal end portions adhered to the two flat surfaces 44 of the electrode assembly 14 and a longitudinally intermediate portion partially covering the tab-side end surface 36. On the bottom surface 37, each first holding tape 45 includes two longitudinal end portions adhered to the two flat surfaces 44 of the electrode assembly 14 and a longitudinally intermediate portion partially covering the bottom surface 37. The second holding tapes 47 are respectively adhered to the side surfaces 38, which are the two widthwise sides of the electrode assembly 14, to cover the side surfaces 38. The strip of each second holding tape 47 has a U-shaped cross-section when adhered. Each second holding tape 47 includes two longitudinal end portions adhered to the two flat surfaces 44 of the electrode assembly 14 and a longitudinally intermediate portion partially covering the side surface 38.

The separators 27 will now be described in detail.

As shown in FIG. 3, the separators 27 are opposed to each other. Each separator 27 includes a tetragonal first separator portion 28 and a tetragonal second separator portion 29, which have the same size. The first separator portion 28 and the second separator portion 29 are each large enough to cover lateral surfaces of the positive electrode 21. The separator 27 includes an accommodation portion that receives a portion of the positive electrode 21 excluding the positive electrode tab 31. The first separator portion 28 and the second separator portion 29 each include four edges and extensions 30. When the first separator portion 28 and the second separator portion 29 are stacked, the extensions 30 extend beyond the first side 22c, the second side 22e, and the third sides 22f of the positive electrode 21. More specifically, the extensions 30 of each of the first separator portion 28 and the second separator portion 29 extend from an accommodation portion 27a to the four edges. The separator 27 includes portions of the extensions 30 of the first separator portion 28 and the second separator portion 29 that are opposed to the positive electrode tab 31, which define tab opposing portions 27g.

Each separator 27 includes a welded portion 39 that is formed by thermally welding the extensions 30 of the first separator portion 28 excluding the tab opposing portion 27g and the extensions 30 of the second separator portion 29 excluding the tab opposing portion 27g. The welded portion 39 is arranged along the first side 27c, the second side 27e, and the third sides 27f of the separator 27, that is, the four edges of the separator 27. The welded portion 39 includes two opposing parts 39a that extend along the first side 27c of the separator 27 and are located proximate to the corresponding corners C. More specifically, the welded portion 39 includes the opposing parts 39a that are located at opposite sides of the tab opposing portions 27g in a direction extending along the first side 27c.

The opposing parts 39a are located at the corners C where the first side 27c of the separator 27 intersects with the two third sides 27f, which are continuous with the first side 27c. Each opposing part 39a continuously extends on the first side 27c and the corresponding third side 27f. More specifically, the opposing parts 39a are located toward the corresponding third sides 27f from the positive electrode tab 31. When forming the welded portion 39, heat for welding the third sides 27f is applied to the corner C that are continuous with the first side 27c. Thus, the amount of heat applied to the corners C is greater than the amount of heat applied to other portions. Accordingly, the contraction amount of the corners C is greater than the contraction amount of other portions. As a result, the opposing parts 39a are formed on portions of the first side 27c that are continuous with the corresponding corners C and have been contracted due to the heat applied to the third sides 27f.

The welded portion 39 also includes a cover opposing part 39b that extends along the first side 27c between the two opposing parts 39a and does not include the tab opposing portions 27g. Thus, an opposing part 39a, the tab opposing portions 27g, the cover opposing part 39b, and a further opposing part 39a are arranged next to one another along the first side 27c of the separator 27.

The amount of the opposing parts 39a extending from the accommodation portion 27a is less than the amount of the cover opposing part 39b and other portions extending from the accommodation portion 27a. Thus, at the extension 30 extending along the first side 27c, the opposing parts 39a are located below the cover opposing part 39b. More specifically, the opposing parts 39a are separated from the cover 13 more than the cover opposing part 39b.

Figure 4:
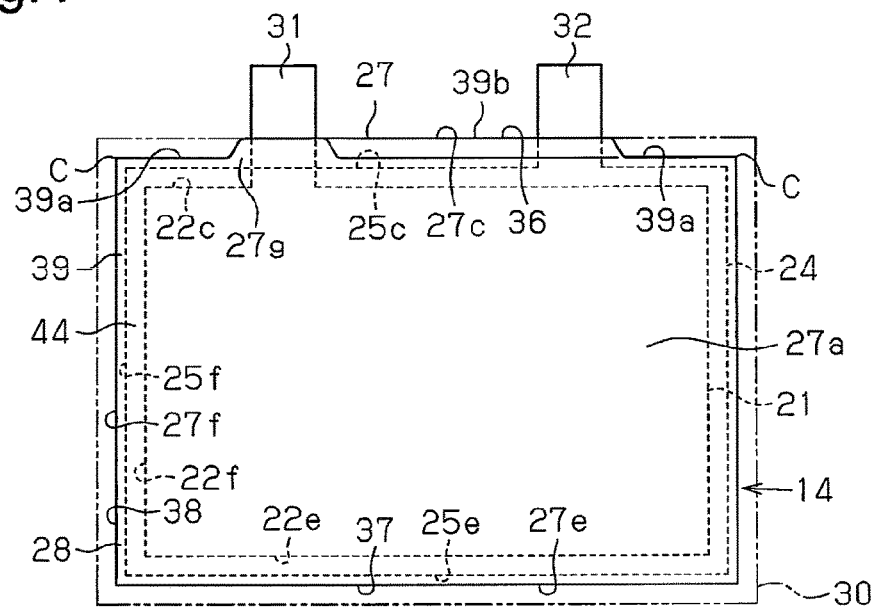
FIG. 4 is a front view showing the electrode assembly shown in FIG. 1.

As shown in FIG. 4, in the electrode assembly 14, the positive electrode 21, which is received in the accommodation portion 27a of the separator 27, and the negative electrode 24 are located so that the entire surface of the positive active material layer 23 and the negative active material layer 26 are opposed to each other with the separator 27 located in between. The welded portion 39 of the separator 27 surrounds four sides of the positive electrodes 21 excluding the positive electrode tab 31. The welded portion 39 is opposed to four outer edges of the negative active material layer 26. The basal portion of the positive electrode tab 31 is located between the tab opposing portions 27g.

As shown in FIG. 2, the terminal-side welding piece 41c is located toward the corresponding corner C of the separator 27 from the positive electrode tab 31. The terminal-side welding piece 42c is located toward the corresponding corner C of the separator 27 from the negative electrode tab 32. Thus, the terminal-side welding pieces 41c, 42c are opposed to the opposing parts 39a. The terminal-side welding piece 41c is connected to the positive electrode terminal 43. The terminal-side welding piece 42c is connected to the negative electrode terminal 46. Thus, the positive electrode terminal 43 and the corresponding opposing part 39a are opposed to each other with the terminal-side welding piece 41c located in between, and the negative electrode terminal 46 and the corresponding opposing part 39a are opposed to each other with the terminal-side welding piece 42c located in between. More specifically, each opposing part 39a is opposed to the cover 13, which serves as a wall opposed to the tab-side end surface 36.

The positive electrode terminal 43 and the negative electrode terminal 46 are fixed to the cover 13 with the posts 43b, 46b extended through the cover 13 and the bases 43a, 46a located in the case 11. The first holding tapes 45 are adhered to the opposing parts 39a, which are opposed to the terminal-side welding pieces 41c, 42c. Thus, the positive electrode terminal 43 and the corresponding first holding tape 45 are opposed to each other with the terminal-side welding piece 41c located in between, and the negative electrode terminal 46 and the corresponding first holding tape 45 are opposed to each other with the terminal-side welding piece 42c located in between. In other words, the first holding tapes 45 are located between the electrode assembly 14 and the positive electrode terminal 43 and between the electrode assembly 14 and the negative electrode terminal 46. Thus, the positive tab-side welding piece 41b and the negative tab-side welding piece 42b are located toward the middle portion from the positive electrode terminal 43 and the negative electrode terminal 46 along the first side 27c.

The operation of the rechargeable battery 10 will now be described.

In the rechargeable battery 10, the positive and negative terminal-side welding pieces 41c, 42c are opposed to the opposing parts 39a in the welded portion 39 of the separator 27. The terminal-side welding pieces 41c, 42c are separated from the opposing parts 39a.

The above embodiment has the advantages described below.

(1) When the first separator portion 28 and the second separator portion 29 are welded to form the separator 27, in addition to heat from the first side 27c, heat from the third sides 27f is applied to the vicinity of the corners C of the first side 27c. Thus, the contraction amount of the opposing parts 39a, which are located in the vicinity of the corners C, is greater than the contraction amount of the cover opposing part 39b. This separates the opposing parts 39a from the cover 13 more than the cover opposing part 39b. In other words, the distance between the opposing parts 39a and the cover 13 is greater than the distance between the cover opposing part 39b and the cover 13. This limits interference of the bases 43a, 46a of the positive electrode terminal 43 and the negative electrode terminal 46, which are fixed to the cover 13, with the opposing parts 39a through the terminal-side welding pieces 41c, 42c in the case 11. Thus, in the manufacturing of the rechargeable battery 10, when the cover is bonded to the electrode assembly 14 with the electrode assembly 14 accommodated in the case body 12, the cover 13 may be placed on the open end of the case body 12 while limiting the interference of the positive electrode terminal 43 and the negative electrode terminal 46 with the separator 27 through the terminal-side welding pieces 41c, 42c. This facilitates the subsequent welding task. Additionally, the separators 27 do not push the positive electrode terminal 43 and the negative electrode terminal 46 toward the cover 13. Thus, load will not be applied to the bonded portions of the cover 13 and the case body 12. This eliminates welding defects.

(2) The separator 27 is manufactured by thermally welding the extensions 30 of the rectangular first separator portion 28 and the extensions 30 of the rectangular second separator portion 29. On the first side 27c of the separator 27, only the opposing parts 39a are located below the tab opposing portions 27g and the cover opposing part 39b. Thus, even when the separator 27 includes the opposing parts 39a, the vicinity of the base portion of the positive electrode tab 31 may be covered by the tab opposing portions 27g. This limits the short-circuiting of the positive electrode tab 31 and the negative active material layers 26.

Thus, the tab opposing portions 27g, which are opposed to the positive electrode tab 31, do not need to be manufactured by cutting the first separator portion 28 and the second separator portion 29 or the like. Additionally, the opposing parts 39a and the tab opposing portions 27g can be formed at the same time as when the separator 27 is manufactured through thermal welding. This simplifies the manufacturing of the separator 27.

If the entire first side 27c of the separator 27 is located at the same height as the tab opposing portions 27g, the first side 27c would interfere with the positive electrode terminal 43 and the negative electrode terminal 46 via the terminal-side welding pieces 41c, 42c. Such interference does not occur.

(3) The first holding tapes 45 are adhered to the opposing parts 39a. The first holding tapes 45 hold the electrode assembly 14. The first holding tapes 45 are opposed to the corresponding terminal-side welding pieces 41c, 42c. Thus, the first holding tapes 45 guard the opposing parts 39a of the separator 27 from the terminal-side welding pieces 41c, 42c.

(4) The tab opposing portions 27g of the separator 27 are non-welded portions, which are not thermally welded. Thus, the tab opposing portions 27g do not contract when the welded portions 39 are formed. This limits the short-circuiting of the positive electrode tab 31 and the negative active material layers 26.

(5) When the welded portion 39 is formed on the corners C of the separator 27, application of heat from the third sides 27f to the first side 27c forms the opposing parts 39a. Thus, the opposing parts 39a may be formed in a process for forming the welded portion 39. This simplifies the formation of the separator 27 and limits the short-circuiting of the positive electrode tab 31 and the negative active material layers 26.

(6) The positive conductive member 41a and the negative conductive member 42a are crank-shaped. The terminal-side welding pieces 41c, 42c are located closer to the tab-side end surface 36 than the positive tab-side welding piece 41b and the negative tab-side welding piece 42b. However, the formation of the opposing parts 39a limits interference of the terminal-side welding pieces 41c, 42c with the separator 27. Thus, the separator 27 that includes the opposing parts 39a is suitable for the rechargeable battery 10 that includes the crank-shaped positive conductive member 41a and negative conductive member 42a.

(7) The tab opposing portions 27g are located above the opposing parts 39a. Thus, even if the negative electrode 24 is displaced toward the distal portion of the positive electrode tab 31 along the plane of the flat surfaces 44, the tab opposing portions 27g limit the short-circuiting of the positive electrode tab 31 and the negative active material layers 26 of the negative electrode 24.

The above embodiment may be modified as follows.

Figure 5:
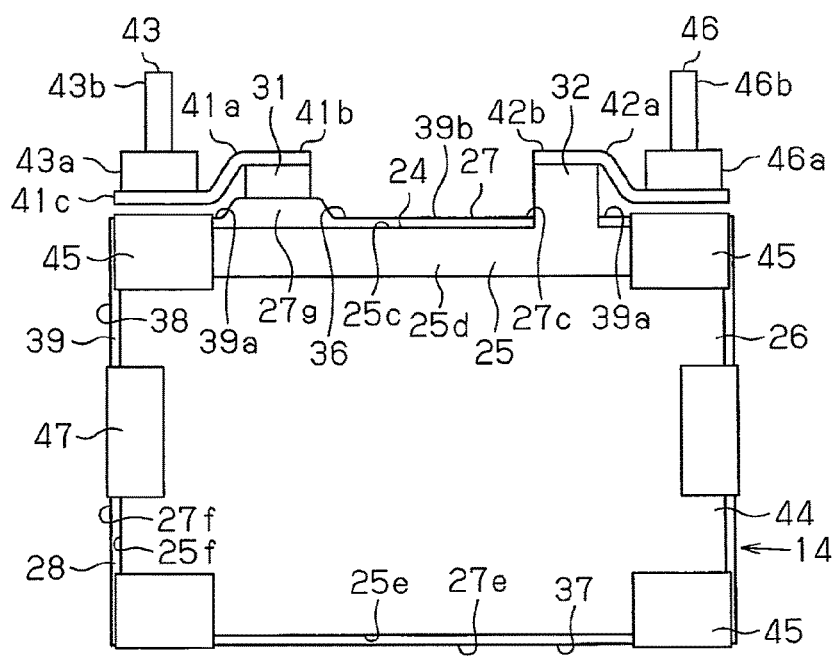
FIG. 5 is a front view showing a modified example of a welded portion.

As shown in FIG. 5, the separator 27 may be configured so that on the first side 27c of the separator 27, all portions except the tab opposing portions 27g have a greater thermal contraction amount than the tab opposing portions 27g. This locates the all portions except the tab opposing portions 27g below the tab opposing portions 27g. In this case, other parts of the welded portion 39 corresponds to the welded portion 39 located on the second side 27e and the third sides 27f of the separator 27.

In the embodiment, the opposing parts 39a are formed when the third sides 27f and the first side 27c are welded. Instead, when forming the welded portion 39 on the first side 27c, the opposing parts 39a may be formed by increasing the amount of heat applied to portions where the opposing parts 39a are formed compared to the amount of heat applied to other portions.

In the first side 27c of the separator 27, the tab opposing portions 27g may be thermally contracted.

The first holding tapes 45 do not need to be adhered to the opposing parts 39a. To integrally hold the electrode assembly 14, the first holding tapes 45 may be adhered to positions other than the opposing parts 39a.

The positive conductive member 41a and the negative conductive member 42a may be flat instead of crank-shaped. The terminal-side welding pieces 41c, 42c may be located at the same height as the positive tab-side welding piece 41b and the negative tab-side welding piece 42b.

In the embodiment, the positive electrode 21 includes the positive active material layers 23 applied to the opposite surfaces of the positive metal foil 22. Instead, the positive electrode 21 may include a positive active material layer 23 applied to only one surface of the positive metal foil 22. In the same manner, in the embodiment, the negative electrode 24 includes the negative active material layers 26 applied to opposite surfaces of the negative metal foil 25. Instead, the negative electrode 24 may include a negative active material layer 26 applied to only one surface of the negative metal foil 25.

In the electricity storage device does not have to be the rechargeable battery 10. More specifically, the present invention may be applied to other electricity storage devices such as an electric double-layer capacitor.

The rechargeable battery 10 is a lithium-ion rechargeable battery. Instead, the rechargeable battery 10 may be a different rechargeable battery. Thus, the present invention is applicable to a rechargeable battery in which ions move between a positive active material layer and a negative active material layer and exchange electric charges.

The invention claimed is:

1. An electricity storage device comprising:
   an electrode assembly that includes
      a positive electrode including a side and a tab that projects from the side,
      a negative electrode including a side and a tab that projects from the side,
      a resin separator that includes a side and insulates the positive electrode from the negative electrode, and
      a tab-side end surface that includes the side of the negative electrode and the side of the separator when the positive electrode, the negative electrode, and the separator are stacked;
   a case that accommodates the electrode assembly, wherein the case includes a wall opposed to the tab-side end surface;
   an electrode terminal fixed to the wall of the case; and
   a conductive member that electrically connects the tab of the positive electrode and the electrode terminal, wherein the electrode terminal and the tab-side end surface are opposed to each other in the case with the conductive member located in between, wherein
   the separator includes a first separator portion and a second separator portion that are opposed and thermally welded to each other,
   the separator includes an accommodation portion that receives a portion of the positive electrode excluding the tab,
   the first separator portion includes an edge and an extension that extends from the accommodation portion to the edge,
   the second separator portion includes an edge and an extension that extends from the accommodation portion to the edge,
   the separator includes a welded portion, formed by thermally welding the extension of the first separator portion and the extension of the second separator portion, and a tab opposing portion that covers a basal portion of the positive electrode tab,
   the welded portion includes opposing parts located at opposite sides of the tab opposing portion in a direction extending along the side of the separator,
   each of the opposing parts is opposed to the electrode terminal with the conductive member located in between,
   each of the opposing parts is configured to have a greater contraction amount than other parts of the welded portion when thermally welded,
   the conductive member is formed by bending a metal plate in a crank-shaped manner, wherein the conductive member includes a tab-side welding piece, a bent portion, and a terminal-side welding piece,
   the tab-side welding piece is located at one side of the bent portion in the conductive member and connected to the tab,
   the terminal-side welding piece is located at the other side of the bent portion in the conductive member and connected to the electrode terminal, and
   the terminal-side welding piece is opposed to the opposing part and located closer to the tab-side end surface than the tab-side welding piece.

2. The electricity storage device according to claim 1, further comprising a holding tape that is located on each of the opposing parts and integrally holds the positive electrode, the negative electrode, and the separator.

3. The electricity storage device according to claim 1, wherein the tab opposing portion is non-welded.

4. The electricity storage device according to claim 1, wherein
   the separator is tetragonal,
   each of the opposing parts is located on a corner of the side of the separator and a further side that is continuous with the side of the separator, and
   the opposing part continuously extends on the side and the further side of the separator.

* * * * *